United States Patent [19]

Funathu

[11] Patent Number: 5,212,591
[45] Date of Patent: May 18, 1993

[54] FOCUSING MECHANISM FOR BINOCULARS

[75] Inventor: Gouzi Funathu, Tokyo, Japan

[73] Assignee: Asahi Kogaku Kogyo Kabushiki Kaisha, Tokyo, Japan

[21] Appl. No.: 599,081

[22] Filed: Oct. 17, 1990

[30] Foreign Application Priority Data

Oct. 18, 1989 [JP] Japan .................... 1-271311

[51] Int. Cl.⁵ .................................. G02B 23/00
[52] U.S. Cl. ............................ 359/407; 359/410; 359/418
[58] Field of Search ................ 350/545–557, 350/145–146; 359/426, 375–380, 404–425

[56] References Cited

U.S. PATENT DOCUMENTS

| 4,162,820 | 7/1979 | Schwab et al. | 350/551 |
| 4,329,013 | 5/1982 | Hengst | 350/551 |
| 4,545,656 | 10/1985 | Takano | 350/552 |
| 4,571,038 | 2/1986 | Jako | 359/376 |
| 4,630,901 | 12/1986 | Altenheiner et al. | 350/552 |
| 4,750,823 | 6/1988 | Riedl | 350/552 |
| 4,867,533 | 9/1989 | Akin, Jr. | 359/425 |
| 4,998,357 | 3/1991 | Farnling et al. | 350/555 |
| 5,064,279 | 11/1991 | Riedl | 359/416 |

FOREIGN PATENT DOCUMENTS 1749772 8/1957 Fed. Rep. of Germany .
7148540 12/1971 Fed. Rep. of Germany .
8404136 5/1984 Fed. Rep. of Germany .
3929825 11/1990 Fed. Rep. of Germany .

Primary Examiner—Bruce Y. Arnold
Assistant Examiner—Thong Nguyen
Attorney, Agent, or Firm—Sandler, Greenblum & Bernstein

[57] ABSTRACT

In binoculars employing a pair of telephotographic optical systems with their respective optical axes being arranged in parallel to each other, the telephotographic optical systems having a lens group for focusing, respectively, and at least one of the telephotographic optical systems having a lens group for diopter-adjusting; first shaft member for simultaneously moving each lens group for focusing in an optical axis direction; and second shaft member for moving the lens group for diopter-adjusting in the optical direction; wherein the first shaft member and the second shaft member are arranged coaxially. Thus, it becomes possible to adjust a diopter-difference and a difference of eye contact positions by means of a single mechanism and to easily adjust focusing with a simple arrangement.

21 Claims, 4 Drawing Sheets

FOCUSING MECHANISM FOR BINOCULARS

BACKGROUND OF THE INVENTION

The present invention relates to a focusing mechanism for binoculars by which the focus is adjusted by moving the objective lenses of two telephotographic optical systems, which have optic axes thereof arranged in parallel, along the optic axis direction thereof, and more particularly to a focusing mechanism capable of improving the operating performance with a simple arrangement.

Conventionally, binoculars having two telephotographic optical systems, disposed with the optic axes thereof arranged in parallel, are generally provided with a focusing mechanism for simultaneously moving the eye pieces of right and left telephotographic optical systems in the optic axis direction thereof, and a diopter difference adjustment mechanism for independently moving one of the eye contact portions. The so-called diopter-adjusting operation is executed, as described below, by correcting a diopter difference between the eyes of an operator. The diopter difference adjustment mechanism adjusts a diopter difference between the right and left eyes of the operator and the focus adjustment mechanism adjusts the focus so that the diopter difference is adjusted.

However, in the case of binoculars when the objective lenses of two telephotographic optical systems which are disposed in parallel are fixed at the same position in the optic axes directions, a positional difference of the right and left eye contact portions (i.e., eye pieces), may be caused by a difference of the focal length of each of the objective lenses which occurs due to an error in manufacturing. In other words, the eye contact portion on the side of the objective lens having a longer focal length is more projected in the optic axis direction. In this case, the objective lens of the projected eye contact portion is forwardly dislocated by inserting a washer into the position where the objective lens is fixed, so that the right and left eye contact portions are equally positioned in the optic axes directions. Hereinafter, this adjustment is referred to as an adjustment of a difference of eye contact positions. Several kinds of washers having a different thickness are prepared and are selected and inserted in accordance to the amount of projection of the eye contact portion having been caused in accordance with a difference of the focal length of the objective lenses.

Recently proposed binoculars have been provided with telephotographic optical systems disposed in parallel with objective lenses having a uniform distance between the optic axes thereof. Wherein, the optic axis of the objective lens in each of the telephotographic optical systems is eccentrically arranged with respect to the optic axis of an eye piece by a so-called Porro prism as an erecting prism system interposed between the objective lens and the eye piece, and an eye contact portion is rotated about the axis of the objective lens thereby to adjust the width between the eyes. In this type of binocular, a focusing mechanism is provided with the objective lenses in which the distance between optic axes thereof is not changed, since it is easier to provide the focusing mechanism on the objective lenses in which the distance of the optic axes is not changed as compared with the case in which the focusing mechanism is provided on the eye contact portions arranged to be rockingly moved for adjusting the width therebetween. Thus, a focusing operation is carried out by moving the objective lenses in an optic axis direction.

Nevertheless, when a focusing operation is carried out by moving the objective lenses as described above, a problem arises in that the arrangement of the binoculars is made complex in the portion near the objective lenses. In addition, the job of adjusting a difference between the eye contact positions carried out by adjusting the position of the objective lenses, is troublesome and requires skill because attention must be paid to not make the surface of the lenses dirty by grease applied to the sliding surface of objective lens frames to smoothly move the frames of the objective lenses, when the focusing operation is carried out.

Further, the above binoculars have two kinds of adjustment mechanisms, i.e., a mechanism for adjusting a diopter difference and a mechanism for adjusting a difference of eye contact positions which are optically the same mechanism, and thus the provision of the two adjustment mechanisms is useless.

SUMMARY OF THE INVENTION

It is therefore an object of the invention to provide an improved focusing mechanism for binoculars which includes a function for adjusting a diopter difference and a difference of eye contact positions with a simple and easy to use focusing arrangement.

For this purpose, according to the present invention, a binocular comprises;

a pair of telephotographic optical systems with their respective optical axes being arranged in parallel to each other, the telephotographic optical systems having a lens group for focusing, respectively, and at least one of the telephotographic optical systems having a lens group for diopter-adjusting;

first shaft means for simultaneously moving each lens group for focusing in an optical axis direction; and second shaft means for moving the lens group for diopter-adjusting in the optical direction;

wherein the first shaft means and the second shaft means are arranged coaxially.

BRIEF DESCRIPTION OF THE ACCOMPANYING DRAWINGS

DETAILED DESCRIPTION OF THE EMBODIMENTS

An embodiment of the present invention will be described below with reference to attached drawings.

Figure 1:
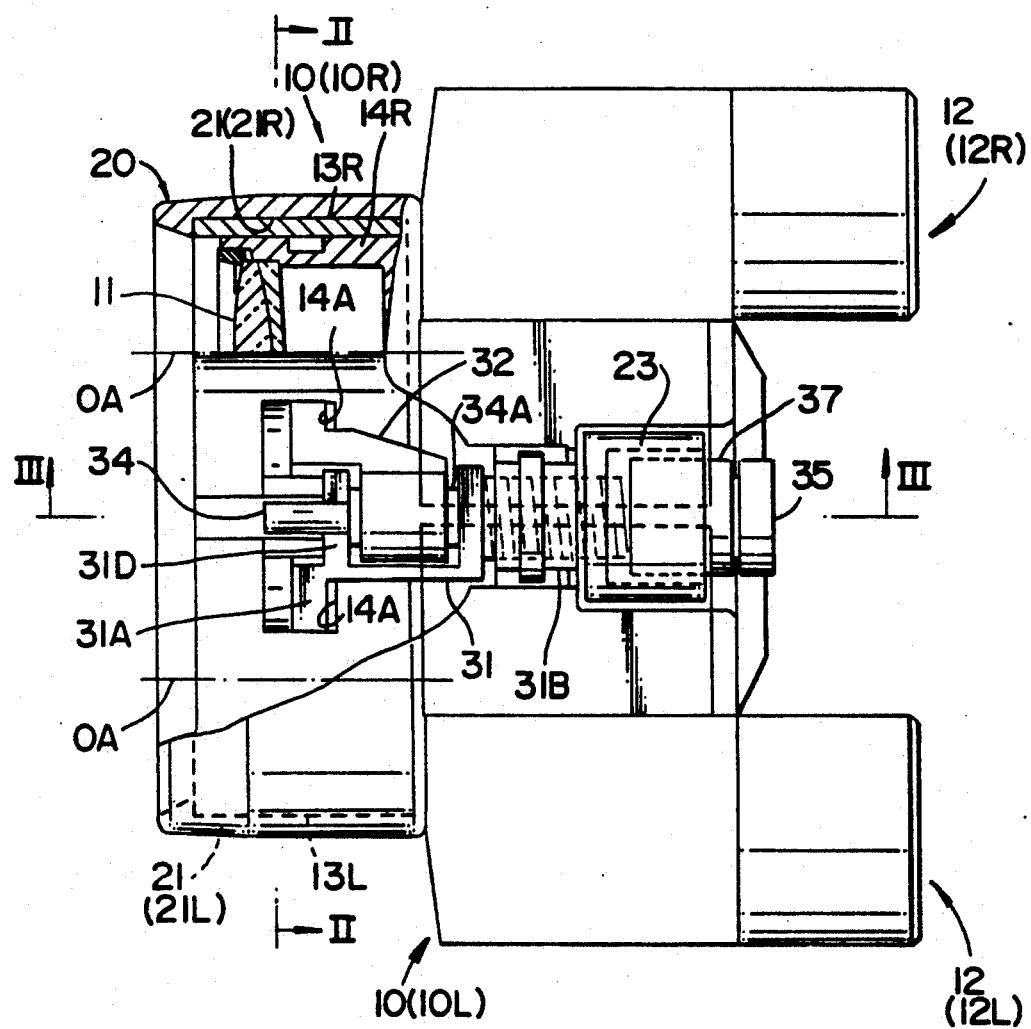
FIG. 1 is a plan view, partly in cross section of a binocular illustrating an embodiment of a focusing mechanism of a binocular according to the present invention.
Figure 2:
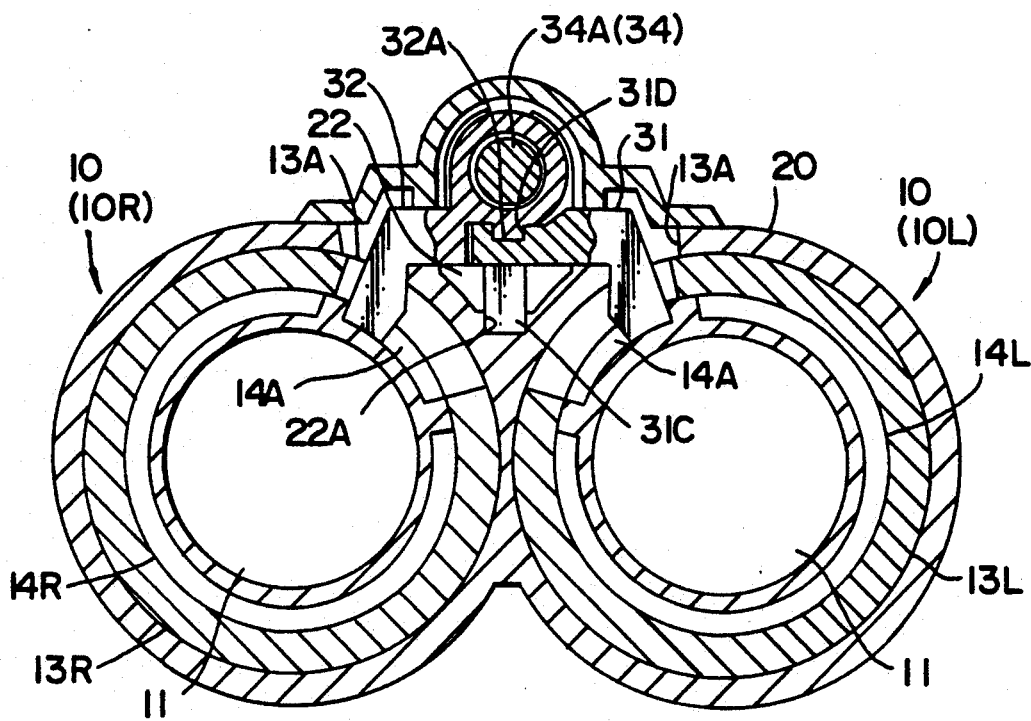
FIG. 2 is a cross-sectional view taken along the line II—II of FIG. 1.
Figure 3:
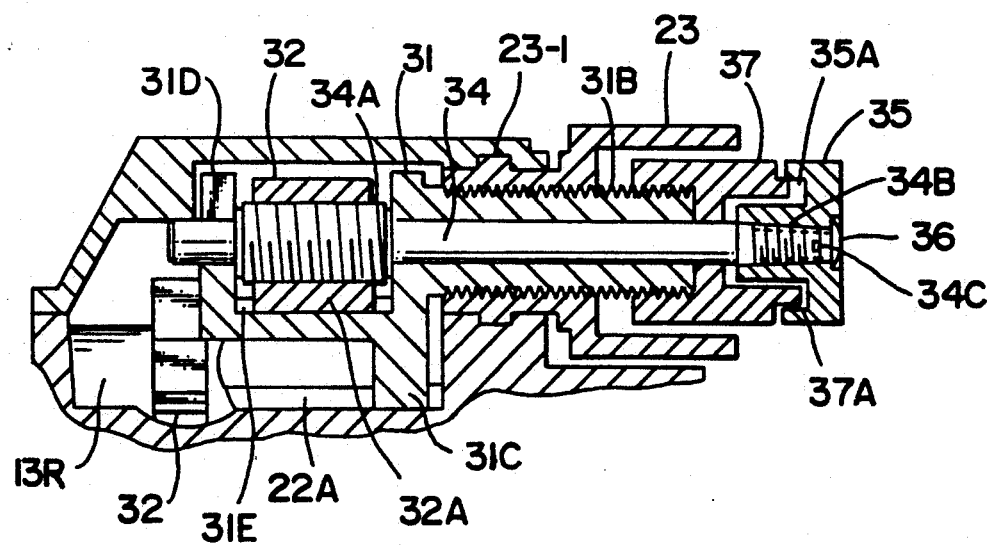
FIG. 3 is a cross-sectional view taken along the line III—III of FIG. 1.

FIG. 1 is a plan view, partly in cross section of a binocular illustrating an embodiment of a focusing mechanism for a binocular according to the present invention. FIG. 2 is a cross-sectional view taken along the line II—II of FIG. 1. Further, FIG. 3 is a cross-sectional view taken along the line III—III of FIG. 1.

The shown binocular include two right and left telephotographic optical systems 10 (10L, 10R). Each of the telephotographic optical systems employs a Porro prism as an erecting prism and is composed of an eye contact portions 12 (12L, 12R) disposed eccentrically by a predetermined amount with respect to the optic axis OA of the objective lens thereof. The objective lens barrels 13 (13L, 13R) of the telephotographic optical systems are slidingly and rotatingly engaged with holding holes 21 (21L, 21R) defined in parallel in a connecting and holding member 20, respectively. More specifically, each of the telephotographic optical systems 10L, 10R respectively have objective lenses with the optic axes OA, OA thereof arranged in parallel and mounted in the connecting and holding member 20 in such a manner that they can rotate about the optic axes OA of the respective objective lenses.

The rotation of the objective lenses of each of the telephotographic optical systems 10L, 10R about the optic axes thereof are interlocked with each other by a (not shown) interlock mechanism, and the interlocked rotation changes an interval between both the eye contact portions 12L, 12R to adjust the width between the eyes of the operator.

Lens frames 14L, 14R each including the objective lens 11 are inserted into the objective lens barrels 13L, 13R in such a manner that they are slidingly movable in the optic axis OA direction.

A focusing mechanism including an eye contact position adjusting function and a diopter difference adjusting function is mounted on the central upper surface of the connecting and holding member 20 between the positions, including the holding holes 21L, 21R, at which each of the telephotographic optical systems 10L, 10R are mounted.

The focusing mechanism comprises a slider 31 which serves as an objective lens moving member and is disposed in a recessed portion 22 for accommodation thereof in such a manner that it can be moved by a predetermined amount in a direction parallel to the optic axis OA of the objective lens 11, and a rotating member 23, which is mounted on the connecting and holding member 20, the slider 31 being moved by the rotating member 23.

The slider 31 has an operation arm 31A engaged with the lens frame 14L of the telephotographic optical system 10L at the one side (left side in this embodiment) and projecting integrally therewith, a focus adjustment screw 31B extending integrally therewith at the end of the rear side (i.e., on the side of the eye contact portion 12), and a guide portion 31C disposed at the lower side of the rear end thereof and slidingly engaged with the guide groove 22A defined on the bottom of the recessed portion 22 for accommodation in parallel with the optic axis OA of the objective lens 11.

The focus adjustment screw 31B is threaded with the inner circumferential screw threads of the rotating member 23 which is rotatingly attached to the connecting and holding member 20 in such a manner that it cannot be moved in the rotating axis direction of the connecting and holding member 20 by means of the projection 23-1, and the slider 31 is moved along the guide groove 22A in parallel with the optic axis OA of the objective lens 11 by the rotation of the rotating member 23.

Further, an adjustment shaft 34 having an adjustment screw portion 34A formed at the intermediate portion of the front end thereof is attached to the slider 31, the front end of the adjustment shaft 34 being held by the front wall 31D of the slider 31 and the rear end thereof rotatingly passing through the center of the focus adjustment screw 31B.

A movable operation arm 32 is arranged to be brought into engagement with the lens frame 14R of the right telephotographic optical system 10R and is threadingly attached to the adjustment screw portion 34A of the adjustment shaft 34.

The movable operation arm 32 is attached to the slider 31 with the guide 32A, which projects from the lower surface thereof, which engages the guide groove 31E defined in the slider 31 in a direction parallel with the moving direction thereof (i.e., in parallel with the optic axis OA of the objective lens) so that the movable operating arm 32 can be relatively moved by the rotation of the adjustment shaft 34 by a predetermined amount with respect to the slider 31 in the same direction as that in which the slider 31 moves.

More specifically, the slider 31 has the operation arm 31A projecting integrally therewith and engaged with the lens frame 14L of the telephotographic optical system 10L on the one side thereof and the movable operation arm 32 projecting therefrom and engaged with the lens frame 14R of the telephotographic optical system 10R on the other side thereof, and is movable in parallel with the optic axis OA of the objective lens 11 by the rotation of the rotating member 23.

As shown in FIG. 2, the operation arm 31A and the movable operation arm 32 are respectively inserted into a pair of engaging grooves 14A, 14A of the lens frames 14L, 14R through the transparent holes 13A, 13A defined in the objective lens barrels 13L, 13R, and thus, each of the lens frames 14L, 14R with the objective lenses are also moved in the objective lens barrels 13L, 13R.

Note that a moving stroke of the movable operation arm 32 with respect to the slider 31 caused by the rotation of the adjustment shaft 34 is set to a predetermined amount (for example, 1.5 mm) which is obtained by adding an adjustment amount of a difference of an eye contact position (for example, +/− 1 mm) when the binoculars are assembled and a moving amount necessary for adjusting a diopter difference (for example, +/− 0.5 mm).

A tapered portion 34B is defined at the rear end of the adjustment shaft 34 projecting from the focus adjustment screw 31B, and an adjustment dial 35 is engaged with the tapered portion 34B and fixed by a screw 38. Further, a diopter difference adjustment range regulation ring 37 is threadingly attached to the rear end of the focus adjustment screw 31B, a stopper 37A is projected in a circumferential direction within a predetermined angular range from the rear end of the diopter difference adjustment range regulation ring 37 confronting the adjustment dial 35, and a rotating range regulation lug 35A, which interferes with the rotating range of the stopper 37A, is projectingly disposed on the side of the adjustment dial 35. Note that the stopper 37A of the diopter difference adjustment range regulation ring 37 and the rotating range regulation lug 35A of the adjustment dial 35 are arranged such that a rotatable range of the adjustment dial 35, where the stopper 37A does not interfere with the rotating range regulation lug 35A, just corresponds to a rotational angle (a rotating angle of the adjustment shaft 34 for moving the movable operation arm 32 with respect to the slider 31 by an amount necessary to adjust a diopter difference: e.g., +/−150°-300°) necessary to adjust a diopter difference of the adjustment shaft 34.

With the focusing mechanism arranged as described above, the rotation of the rotating member 23 enables the slider 31 to move in parallel with the optic axis OA of the objective lenses 11, 11 so that the lens frames 14L, 14R respectively mounting the objective lenses 11, 11 of each of the telephotographic optical systems 10L, 10R are moved, whereby focusing can be carried out as well as the rotation of the adjustment shaft 34 can move only the objective lens 11 on the side of the telephotographic optical system 10R. As a result, an adjustment of a difference of an eye contact position and an adjustment of a diopter difference can be carried out together.

More specifically, the adjustment of a difference of an eye contact position can be carried out in such a manner that the movable operation arm 32 is moved with respect to the slider 31 by the rotation of the adjustment shaft 34 thereby to move the objective lens 11 on the side of the telephotographic optical system 10R so that the focusing positions of the objective lenses 11, 11 of both the telephotographic optical systems 10L, 10R are located at the same position on the side of the eye contact portions 12 when the focusing position of the objective lens 11 on the side of the telephotographic optical system 10L is used as a reference. Then, the adjustment of a diopter difference is carried out in such a manner that the adjustment shaft 34 is rotated in accordance with a diopter difference of the right and left eyes of a user using the diopter of the left eye of the user as a reference from the condition that the focusing positions of the objective lenses 11, 11 of the right and left telephotographic optical systems 10L, 10R are located at the same position (i.e., the condition under which a diopter difference is "0") so that the objective lens 11 on the side of the right telephotographic optical system 10R is moved.

The adjustment of a difference of the eye contact position is carried out using a driver or the like in such a manner that the adjustment shaft 34 is rotated with a slit 34C defined at the extreme end of the diopter difference adjustment shaft 34 on condition that the adjustment dial 35 has been not fixed to the adjustment shaft 34. After the completion of the adjustment, the adjustment dial 35 is fixed so that the rotating range regulation lug 35A thereof is located at the center of the range in which the rotation of the rotating range regulation lug 35A is not regulated by the stopper 37A of the diopter difference adjustment range regulation ring 37 (i.e., the range of rotation within which a diopter can be adjusted). With this arrangement, a rotating angular range of the adjustment dial 35, (i.e., adjustment shaft 34) can be equally set in the right and left directions. More specifically, an adjustable range of a diopter difference can be equally set in the right and left directions about the center of a diopter difference "0".

Referring to the drawings of FIGS. 4 and 5, a further improved embodiment of the present invention will be described hereinafter.

In this embodiment, a mounting arrangement for the adjustment shaft 34 to the slider 31 as well as a mounting arrangement for the movable operation arm 32 to the adjustment screw portion 34A provided on the adjustment shaft 34, respectively differ from those of the above embodiment. In the drawings of FIGS. 4 and 5, for the same portions as the above embodiment, the same numerals are designated.

Figure 4:
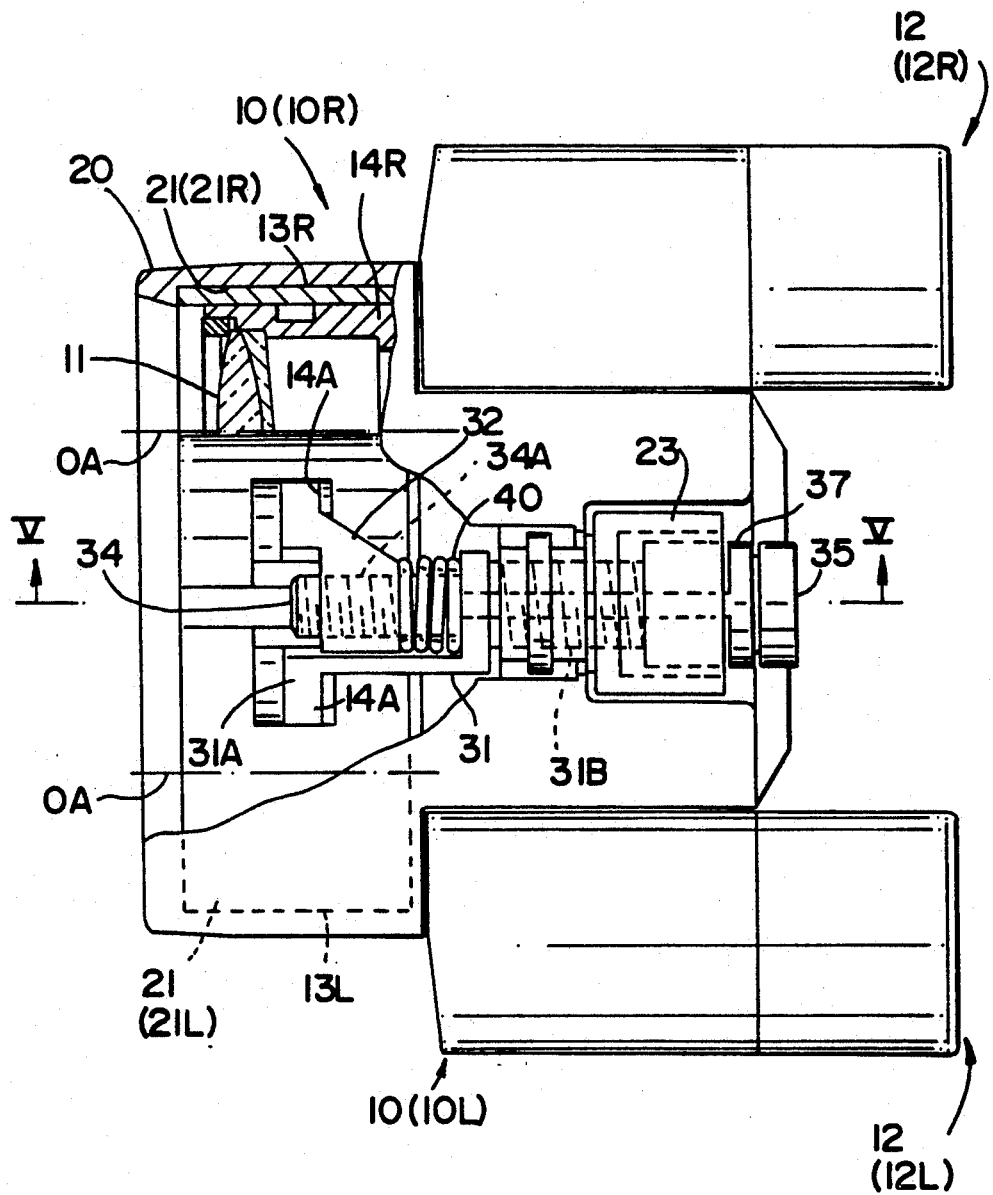
FIG. 4 is a plan view, partly in cross section of binoculars illustrating a modified embodiment of a focusing mechanism.
Figure 5:
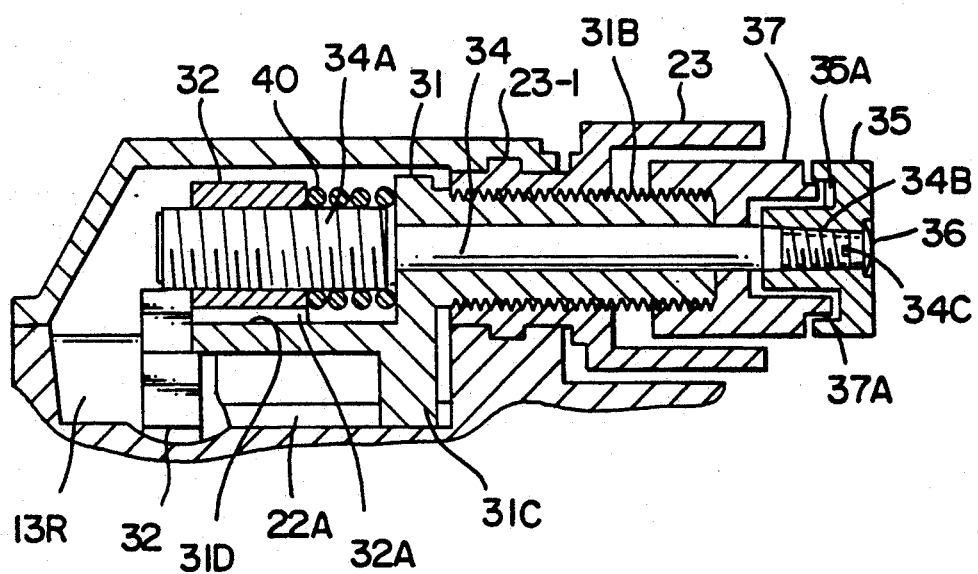
FIG. 5 is a cross-sectional view taken along the line V—V of FIG. 4.

As shown in FIGS. 4 and 5, the front end of the adjustment shaft 34 is not supported by the slider 31, but supported only at the opposite end, (i.e., the focus adjustment screw 31B side). It is not necessary to support the adjustment shaft 34 at the both ends since the adjustment shaft 34 has sufficient length, and accordingly, it can be stably supported at the one end. Therefore, it becomes possible to make the whole volume of the binocular compact since it is not necessary to provide the parts for supporting the front end of the adjustment shaft 34.

Further, a spring member 40 is provided around the adjustment shaft 34 between the rear edge of the movable operation arm 32 and the front side edge of the slider 31 opposed to the rear edge of the movable operation arm 32. The movable operation arm 32 is oppositely biased from the slider 31 by the spring member 40, and accordingly the, so-called back lash generated between the movable operation arm 32 and the adjustment screw portion 34A is regulated. Therefore, it becomes possible to accurately and smoothly carry out the diopter difference adjustment by rotating the adjustment screw portion 34A.

With the focusing mechanism for binoculars according to the present invention, both a diopter difference and a difference of eye contact positions can be adjusted by means of a single mechanism. Moreover, the binoculars can be simply arranged, and a difference of the eye contact positions can be easily adjusted, whereby the operation performance of the binoculars is improved.

What is claimed is:

1. A binocular comprising:

a pair of telephotographic optical systems with their respective optical axes being arranged in parallel to each other, each of said telephotographic optical systems has a lens group for focusing, and at least one of said lens groups being used for diopter-adjusting;

first shaft means for simultaneously moving each said lens group for focusing in an optical axis direction, said first shaft means including a first operating member located at an end portion thereof; and second shaft means for moving said at least one of said lens groups for diopter-adjusting in said optical axis direction, said second shaft means including a second operating member located at an end portion thereof;

wherein said first shaft means and said second shaft means are arranged coaxially, and said end portion of said first shaft means being located adjacent said end portion of said second shaft means; and said first shaft means being arranged to be movable by means of a focus adjustment screw arranged to be movable by means of one of said operation members, said one of said operation members being threaded with inner circumferential screw threads attached to the binocular, and a slidable member arranged to be slidable along an axis parallel to said optical axes for moving said pair of telephotographic optical systems when said one of said operation member is operated, whereby said pair of telephotographic optical systems are moved along said optical axes as said first shaft means is moved.

2. The binocular according to claim 1, wherein said first shaft means and said second shaft means are arranged in parallel to said optical axes.

3. The binocular according to claim 1, wherein said first shaft means and said second shaft means are located at a central portion between said pair of telephotographic optical systems.

4. The binocular according to claim 1, wherein said first shaft means is arranged to be movable in parallel to said optical axes when a focusing operation is executed, and wherein said second shaft means is arranged to be rotatable when a diopter-adjusting operation is executed.

5. The binocular according to claim 1, wherein a predetermined portion of said second shaft means is connected to an arm member which contacts said at least one of said lens groups in a predetermined manner.

6. The binocular according to claim 5, wherein said predetermined manner comprises a pair of threaded portions respectively provided on said second shaft means and said arm member, and arranged to be brought into engagement with each other.

7. The binocular according to claim 5, wherein said predetermined portion of said second shaft means is supported at one position in a direction parallel to said optical axes.

8. The binocular according to claim 7, which further comprises a biasing member for biasing said arm member away from the position at which said predetermined portion of said second shaft means is supported.

9. The binocular according to claim 8, wherein said biasing member comprises a spring member provided between said position and said arm member.

10. The binocular according to claim 1, wherein said first and second shaft means are supported by at least two positions in a direction parallel to said optical axes.

11. The binocular according to claim 1, wherein each said lens group comprises a respective objective lens group of said pair of said telephotographic optical systems.

12. A binocular comprising:
a pair of telephotographic optical systems with their respective optical axes being arranged in parallel to each other, each of said telephotographic optical systems has a lens group for focusing, and at least one of said lens groups being used for diopter-adjusting;
first shaft means for simultaneously moving each said lens group for focusing in an optical axis direction;
second shaft means for moving said at least one of said lens groups for diopter-adjusting in said optical axis direction; and
wherein said first shaft means and said second shaft means are arranged concentrically, and said first shaft means includes an opening along an axis thereof, said second shaft means extending through said opening.

13. The binocular according to claim 12, wherein said first shaft means and said second shaft means are parallel to said optical axes.

14. The binocular according to claim 12, wherein said first shaft means and second shaft means are located at a central portion between said pair of telephotographic optical systems.

15. The binocular according to claim 12, wherein said first shaft means and said second shaft means are operated by respective operation members.

16. The binocular according to claim 15, wherein said first shaft means is arranged to be movable by means of a focus adjustment screw arranged to be movable by means of one of said operation members, said one of said operation members being threaded with inner circumferential screw threads attached to the binocular, and a slidable member arranged to be slidable along an axis parallel to said optical axes for moving said pair of telephotographic optical systems when said one of said operation members is operated, whereby said pair of telephotographic optical systems are moved along said optical axes as said first shaft means is moved.

17. The binocular according to claim 12, wherein a predetermined portion of said second shaft means is connected to an arm member which contacts said at least one of said lens groups in a predetermined manner.

18. The binocular according to claim 17, wherein said predetermined manner comprises a pair of threaded portions respectively provided on said second shaft means and said arm member, and arranged to be brought into engagement with each other.

19. A binocular comprising:
a pair of telephotographic optical systems with their respective optical axes being arranged in parallel to each other, each of said telephotographic optical systems has a lens group for focusing, and at least one of said lens groups being used for diopter-adjusting;
first shaft means for simultaneously moving each said lens group for focusing in an optical axis direction;
second shaft means for moving said at least one of said lens groups for diopter-adjusting in said optical axis direction;
said first shaft means and said second shaft means being operated by respective operation members; and
wherein said first shaft means and said second shaft means are arranged coaxially, and wherein said first shaft means is arranged to be movable by means of a focus adjustment screw arranged to be movable by means of one of said operation members, said one of said operation members being threaded with inner circumferential screw threads attached to the binocular, and a slidable member arranged to be slidable along an axis parallel to said optical axes for moving said pair of telephotographic optical systems when said one of said operation members is operated, whereby said pair of telephotographic optical systems are moved along said optical axes as said first shaft means is moved.

20. The binocular according to claim 19, which further comprises a locking mechanism for locking said first shaft means in a rotating direction.

21. The binocular according to claim 20, wherein said locking mechanism comprises a projection portion provided on said one of said operation members, which is brought into engagement with said first shaft means.

* * * * *